United States Patent
Kamble

(10) Patent No.: US 10,263,883 B2
(45) Date of Patent: Apr. 16, 2019

(54) DATA FLOW CONFIGURATION IN HYBRID SYSTEM OF SILICON AND MICRO-ELECTRO-MECHANICAL-SWITCH (MEMS) ELEMENTS

(71) Applicant: International Business Machines Corporation, Armonk, NY (US)

(72) Inventor: Keshav G. Kamble, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 15/378,792

(22) Filed: Dec. 14, 2016

(65) Prior Publication Data

US 2018/0167310 A1  Jun. 14, 2018

(51) Int. Cl.
| | | |
|---|---|---|
| H04L 12/729 | (2013.01) | |
| H04L 12/707 | (2013.01) | |
| H04L 12/751 | (2013.01) | |
| H04L 12/715 | (2013.01) | |
| H04L 12/931 | (2013.01) | |
| H04L 12/721 | (2013.01) | |

(52) U.S. Cl.
CPC .......... *H04L 45/125* (2013.01); *H04L 45/02* (2013.01); *H04L 45/24* (2013.01); *H04L 45/38* (2013.01); *H04L 45/64* (2013.01); *H04L 45/66* (2013.01); *H04L 49/70* (2013.01)

(58) Field of Classification Search
CPC .......... H04Q 11/0005; H04Q 11/0062; H04Q 2011/0016; H04Q 2011/0039; H04Q 2011/0073; H04Q 2011/0058; H04Q 11/02; H04J 14/02; H04L 12/6418

See application file for complete search history.

(56) References Cited

U.S. PATENT DOCUMENTS

| | | | | |
|---|---|---|---|---|
| 7,564,612 B2* | 7/2009 | Chui | ............... | G02B 26/001 |
| | | | | 359/224.1 |
| 9,491,526 B1* | 11/2016 | Zhao | ............... | H04Q 11/0005 |
| 2001/0030782 A1* | 10/2001 | Trezza | ............... | G02B 6/4249 |
| | | | | 398/5 |
| 2002/0131675 A1* | 9/2002 | Litvin | ............... | G02B 6/12004 |
| | | | | 385/16 |
| 2013/0083701 A1* | 4/2013 | Tomic | ............... | H04L 12/462 |
| | | | | 370/255 |
| 2013/0287397 A1* | 10/2013 | Frankel | ............... | H04B 10/271 |
| | | | | 398/50 |

(Continued)

FOREIGN PATENT DOCUMENTS

| | | |
|---|---|---|
| CN | 102984064 A | 3/2013 |
| CN | 103716208 A | 4/2014 |
| WO | 2015014198 A1 | 2/2015 |

*Primary Examiner* — Jung Liu

(74) *Attorney, Agent, or Firm* — Patterson + Sheridan, LLP

(57) ABSTRACT

Certain embodiments of the present disclosure provide a method for communicating data flows. The method generally includes receiving control flow information corresponding to a data flow for communication from a first device to a second device, and determining one or more characteristics of the data flow based on the control flow information. For example, the one or more characteristics may include whether the data flow is a mice flow or an elephant flow. In certain aspects, the method further includes communicating the data flow based on the determined characteristics.

15 Claims, 6 Drawing Sheets

(56) References Cited

U.S. PATENT DOCUMENTS

| | | | |
|---|---|---|---|
| 2014/0161447 A1* | 6/2014 | Graves | H04Q 11/0005 398/48 |
| 2014/0233421 A1 | 8/2014 | Matthews | |
| 2014/0237118 A1 | 8/2014 | Matthews | |
| 2015/0071072 A1 | 3/2015 | Ratzin et al. | |
| 2015/0071076 A1 | 3/2015 | Izhak-Ratzin et al. | |
| 2015/0074264 A1 | 3/2015 | Izhak-Ratzin et al. | |
| 2015/0124825 A1 | 5/2015 | Dharmapurikar et al. | |
| 2016/0337727 A1* | 11/2016 | Graves | H04Q 11/0005 |
| 2018/0070157 A1* | 3/2018 | Menard | H04J 14/02 |
| 2018/0091251 A1* | 3/2018 | Hanneman, Jr. | G02B 6/293 |

* cited by examiner though the appended drawings, and that the appended drawings are logically centralized and the underlying network infrastructure is abstracted from the applications. In such abstractions, the underlying data planes can take different forms and can be of different technologies altogether. Different data planes may have different capabilities such as amount of bandwidth, lossless forwarding, type of service identification and forwarding. In today's data center, silicon switches are widely used. They mostly have fixed configurations based on switching chipsets and add considerable latency due to look-ups, store & forward and queuing latencies.

DATA FLOW CONFIGURATION IN HYBRID SYSTEM OF SILICON AND MICRO-ELECTRO-MECHANICAL-SWITCH (MEMS) ELEMENTS

BACKGROUND

A scaled-out, distributed application generally refers to an application with multiple interconnected components that communicate over one or more networks according to specific rules. Software-defined networking (SDN) controller is an approach to computer networking which allows network administrators to manage network services through abstraction of lower level functionality. This is done by decoupling the system that makes decisions about where traffic is sent (the control plane) from the underlying systems that forwards traffic to the selected destination (the data plane). With SDN controller, network intelligence and state are logically centralized and the underlying network infrastructure is abstracted from the applications. In such abstractions, the underlying data planes can take different forms and can be of different technologies altogether. Different data planes may have different capabilities such as amount of bandwidth, lossless forwarding, type of service identification and forwarding. In today's data center, silicon switches are widely used. They mostly have fixed configurations based on switching chipsets and add considerable latency due to look-ups, store & forward and queuing latencies.

Data flows between end points or hosts can be short or long and sustained. The short lived flows may be referred to as mice flows and the long-sustained flows may be referred to as elephant flows due to their sizes in number of bytes and the amount of bandwidth they consume.

In some cases, an SDN may be used to configure data flows between hypervisors. A hypervisor is software running on a particular hardware platform that enables multiple operating systems (OSs) (e.g., virtual machines) to run on the platform at the same time. This feature may be accomplished by "virtualizing," or hiding technical details, of a computer resource from users of that resource. Virtualization may create the appearance to end users or other resources that a single computer resource functions as multiple virtual resources or that multiple physical resources appear as a single virtual resource.

SUMMARY

Certain embodiments of the present disclosure are directed to managing data flows between devices based on a data flow type. For example, a communication path used to send the information may be selected based on the data flow type and bandwidth specifications.

Certain embodiments of the present disclosure provide a method for communication of data flows. The method generally includes receiving control flow information corresponding to a data flow for communication from a first device to a second device, determining one or more characteristics of the data flow based on the control flow information, and communicating the data flow based on the determined characteristics.

Certain embodiments of the present disclosure provide a data communication system. The data communication system generally includes a plurality of communication paths having different attributes with respect to communication of a data flow, a first device coupled to the plurality of communication paths and configured to select a communication path of the plurality of communication paths for communicating the data flow, wherein the first device is configured to communicate the data flow via at least one of the plurality of communication paths based on the selection, and a second device coupled to the plurality of communication paths and configured to receive the data flow via the selected communication path of the plurality of communication paths.

Certain embodiments of the present disclosure provide an apparatus. The apparatus generally includes a memory coupled to a processing system, where the processing system is configured to receive control flow information corresponding to a data flow to be communicated from a first device to a second device. The processing system is further configured to determine one or more characteristics of the data flow based on the control flow information; and communicate the data flow based on the determined characteristics.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Generally, embodiments of the present disclosure are directed to apparatuses and techniques for managing data flows between devices based on a data flow type. For example, multiple devices may be coupled together via a hybrid network that manages data flows. The data flows may have different characteristics. For example, some data flows may be relatively large data flows (otherwise referred to as "elephant flows"), and other data flows may be relatively small (otherwise referred to as "mice flows"). Moreover, certain data flows are to be communicated between devices with low-latency as compared to other data flows. Certain embodiments of the present disclosure are directed to selecting an efficient communication technique for a data flow based on the particular characteristics of the data flow. For example, a data flow that is characterized as an elephant flow that is to be communicated with low latency may be communicated using a micro-electro-mechanical-switch (MEMS) communication path, as opposed to an electrical communication path.

Figure 1:
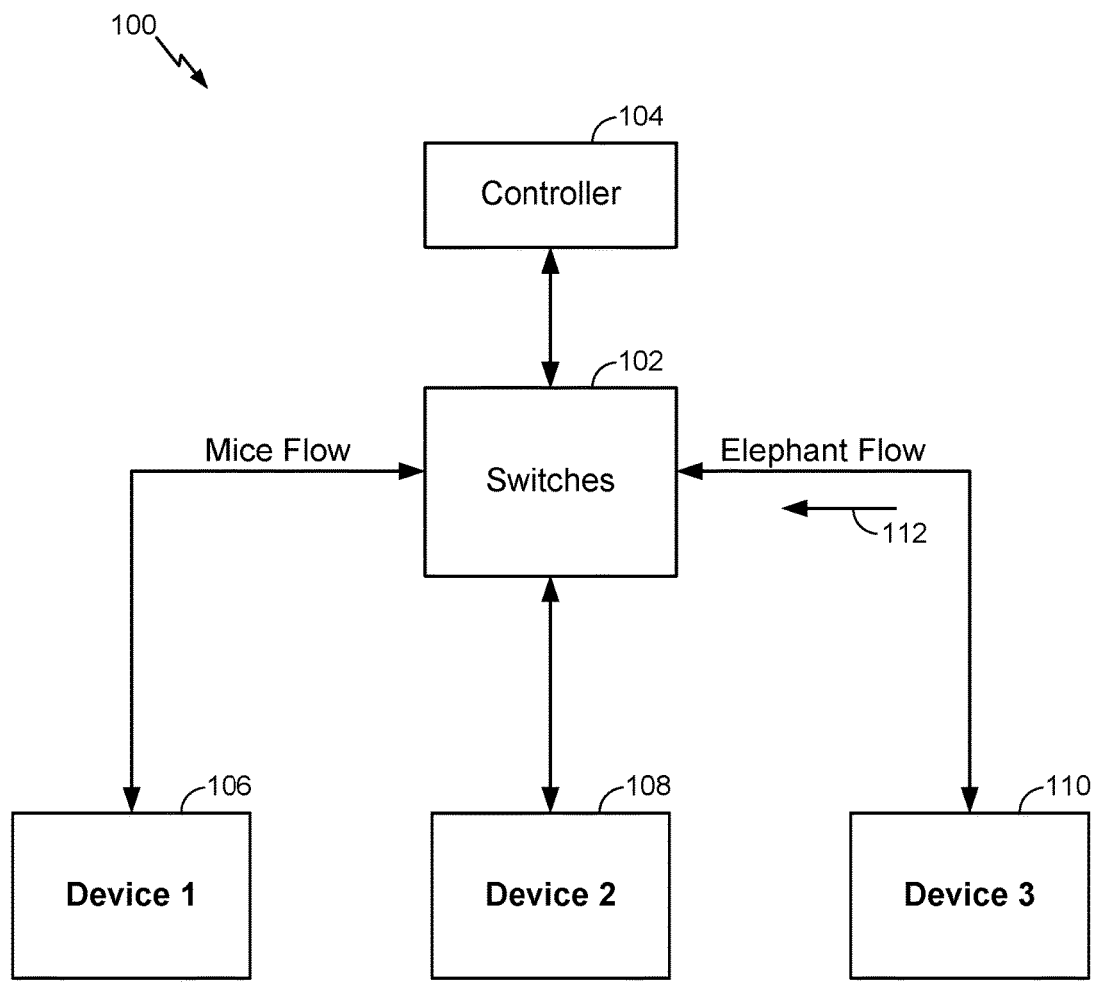
FIG. 1 illustrates an example communication system for communication data flows between multiple devices.

FIG. 1 illustrates an example communication system 100. The communication system 100 may include switches 102 that may be used to direct the flow of data between multiple devices. For example, as illustrated, multiple devices 106, 108, 110 may be coupled to switches 102 and the switches 102 may be operated by a controller 104. Certain data flows (e.g., data flow 112 from device 110) may be relatively large (e.g., elephant flows), while other data flows may be relatively small (e.g., mice flows). In this case, both the elephant flows and the mice flows may be communicated using the same communication path (e.g., via switches 102). For example, the switches 102 may be implemented using silicon switches, which may be not be able to handle high bandwidth. This may be acceptable for communication of mice flows, but inefficient for communication of elephant flows.

In some cases, the switches 102 may be implemented using MEMS to create a communication path. In this case, it may be inefficient to occupy the bandwidth of the MEMS communication path by mice flows, leaving less bandwidth for communication of elephant flows via the MEMS communication path. Certain embodiments of the present disclosure implement multiple communication paths between devices 106, 108, 110 that can be selected for communication of data flows based on a corresponding type of the data flow.

Figure 2:
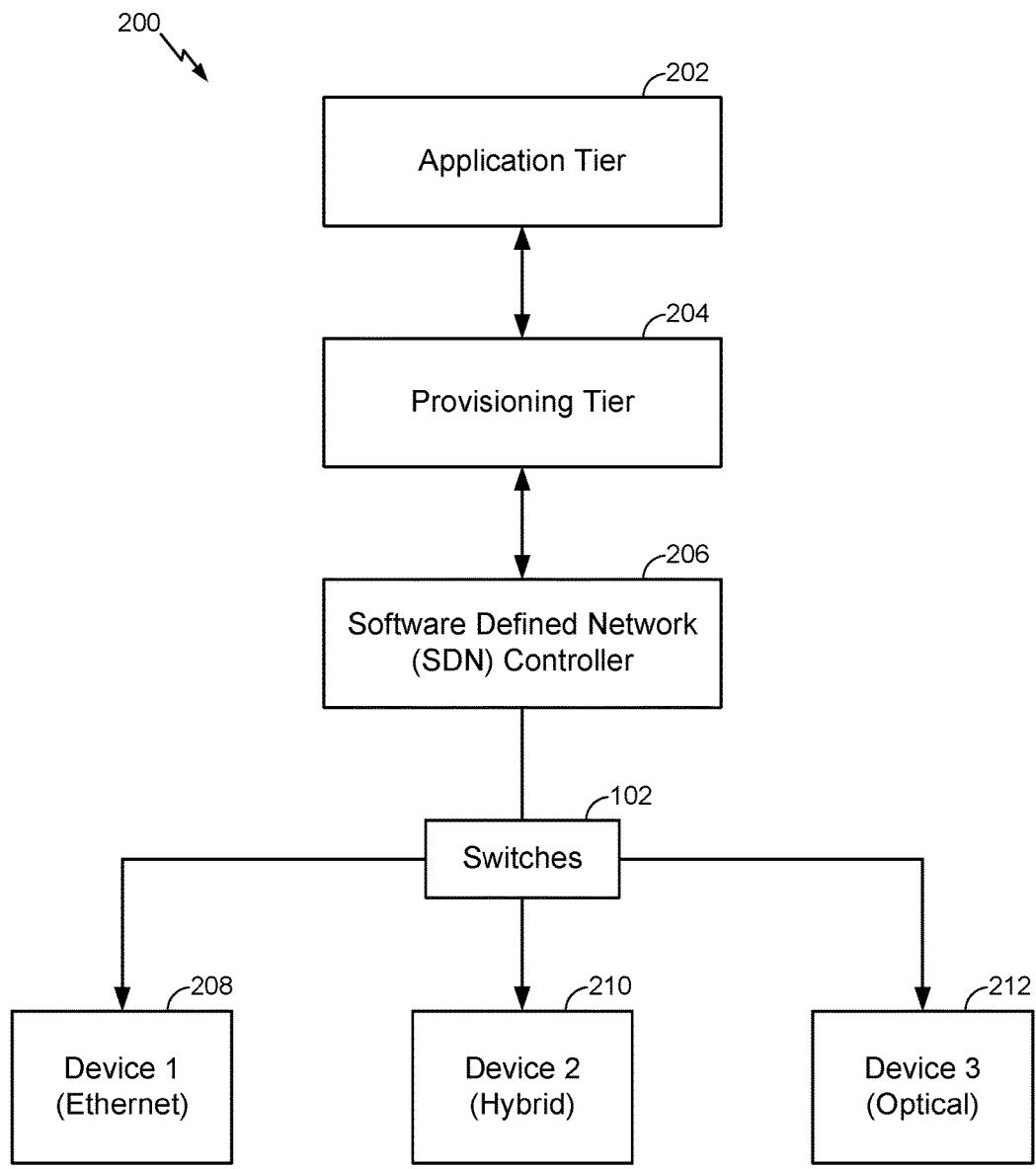
FIG. 2 illustrates an example communication system implemented using a layered protocol.

FIG. 2 illustrates an example communication system 200. As illustrated, the communication system 200 includes an application layer (e.g., application tier) 202. The application layer 202 may be used to run certain application which may be designed to communicate data flows to one or more other devices (e.g., devices 208, 210, 212). The management and orchestration layer (e.g., provisioning tier) 204 may identify the data flows to be communicated and determine the type of service provisioning corresponding to the application that is running on the application layer 202.

Once the data flows and type of service provisioning are identified, the software defined network (SDN) controller 206 controls the lower layer physical infrastructure to properly route the data flows to their destination. For example, the SDN controller 206 allows the state of switches of the network to be configured through software programs running on a logically centralized controller. Such configuration includes populating data packet forwarding rules in the switches to have matching rules to specify what direction to send an incoming packet, e.g., determining at each switch which port of the switch to transmit the packet through. The configuring of switches with data packet forwarding rules from a logically centralized controller allows software applications to directly control the network state by installing rules in the switch routing table data structures.

As illustrated, the SDN controller 206 may control communication of data flows between different types of devices. For example, device 208 of FIG. 2 may be an Ethernet based server rack, while device 212 may be an optical based server rack. However, certain devices (e.g., device 210) may be a hybrid Ethernet and optical based device that may communicate both electrical and optical data flows. Thus, the communication system 200 may be implemented using a hybrid network for communicating both electrical and optical signals. For example, the switches 102 may be MEMS implementing an optical communication path between devices 208, 210, 212. Electrical signals may be converted to optical signals (e.g., via laser diodes) at a transmitting device for communication across the communication path, and converted back to electrical signals at a receiving device. For example, an optical diode may sense optical signals, and generate electric current corresponding to the sensed optical signals. Certain embodiments of the present disclosure implement a hybrid network that can communicate data flows using multiple communication paths and can select the appropriate communication for communicating a data flow based on the corresponding data flow type.

Figure 3:
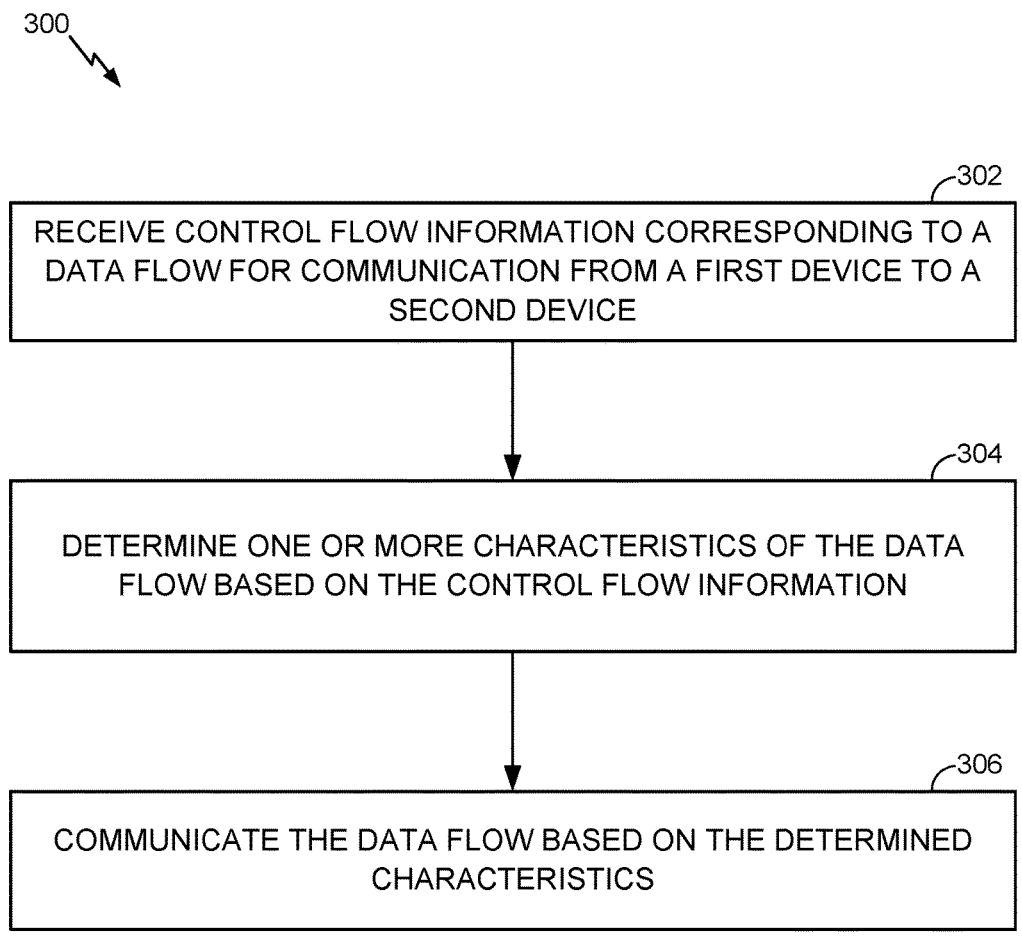
FIG. 3 illustrates example operations for communication of data flows, in accordance with certain embodiments of the present disclosure.

FIG. 3 is a flow diagram of example operations 300 for communicating data flows, in accordance with certain embodiments of the present disclosure. The operations 300 may be performed by a controller (e.g., the SDN controller 206). Although the operations are described in conjunction with FIGS. 1-2 and 4-6, persons skilled in the art will understand that any system configured to perform the operations, in any suitable order, falls within the scope of the present disclosure.

The operations 300 begin at block 302, by receiving control flow information corresponding to a data flow for communication from a first device to a second device, and at block 304, determining one or more characteristics of the data flow based on the control flow information. For example, the control flow information may be analyzed by the controller to determine various attributes of the corresponding data flow, such as whether the data flow the data flow is a mice flow or elephant flow. At block 306, the data flow may be communicated based on the determined characteristics. In certain aspects, the controller 206 also selects a communication path from a plurality of communication paths for communicating the data flow to the second device based on the determined characteristics and communicates the data flow from the first device to the second device based on the selected communication path.

In some cases, the control flow information corresponding to the data flow may include a size of the data flow, latency requirement of the data flow, and/or whether the data flow is an elephant flow or a mice flow. In some cases, the first communication path may be an MEMS path and the second communication path may be a silicon switch path. In certain embodiments, selecting the communication path may include controlling one or more switches configured to direct the data flow to the first communication path or the second communication path.

In some cases, the first communication path may include one or more silicon switches (e.g., for implementing the electrical communication path) and the second communication path may include one or more MEMS (e.g., for implementing an optical communication path). In this case, the communication of the data flow to the second device may include controlling the silicon switches or the MEMS based on the selection of the communication path at block 304. In some cases, the selection of the communication path may be based on an amount of available bandwidth on the communication path and/or a configurable policy.

Figure 4:
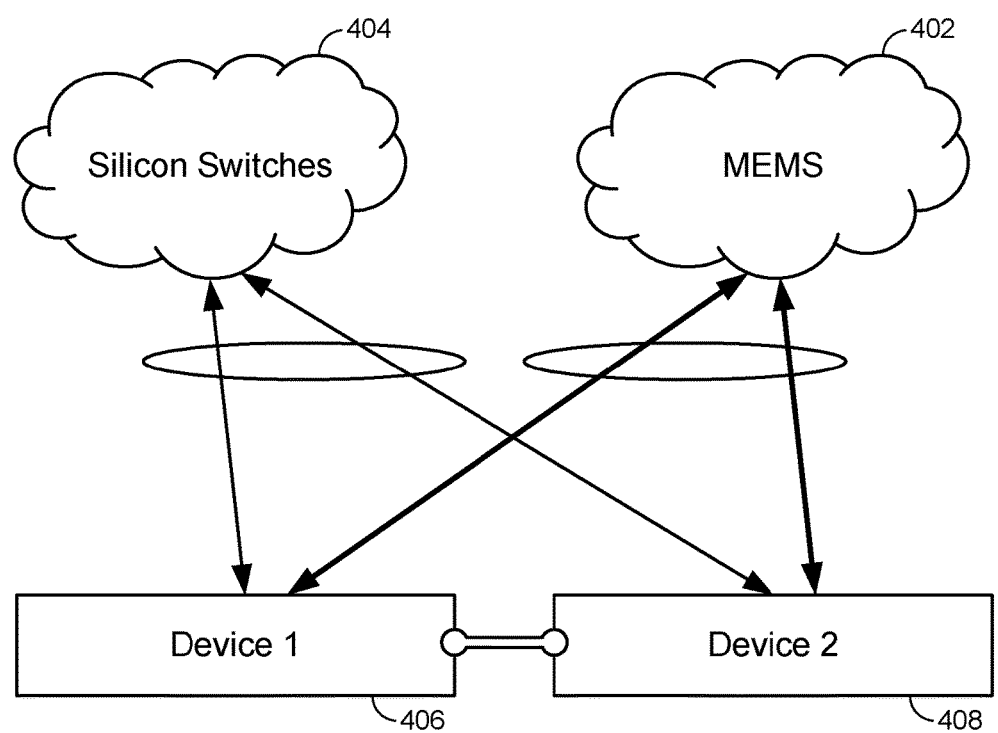
FIG. 4 illustrates an example communication system having micro-electro-mechanical switch (MEMS) and electrical communication paths, in accordance with embodiments of the present disclosure.

FIG. 4 illustrates a communication system 400, in accordance with certain embodiments of the present disclosure. The communication system 400 may include two communication paths between devices 406 and 408, one implemented using MEMS 402, and the other implemented using silicon switches 404. MEMS can provide high bandwidth at low cost. MEMS may have a slow circuit establishment time (e.g., 10 to 25 milliseconds) due to their mechanical nature; however, MEMS provide low latency communication once the switches have been established. Dynamic data traffic in data centers may not be able to tolerate the long establishment delay of MEMS. Thus, for dynamic data traffic, silicon switch communication path may be preferred because silicon based switches (e.g., transistors) can be controlled quickly to establish connection between devices.

Certain embodiments of the present disclosure are directed to the selection of an appropriate communication path (e.g., from the silicon or MEMS paths) based on the data flow type. For example, dynamic data flows may be communicated using the silicon switches, and in some cases, elephant flows may be communicated using MEMS. Communicating elephant flows by selecting the appropriate communication path may improve network congestion, latency and head-of-line blocking which affects short lived mice flows, and thus, enabling high performance, low cost, and effective bandwidth provisioning. Head-of-line blocking generally refers to a situation in which a line of packets are blocked by a first packet in the line.

Figure 5:
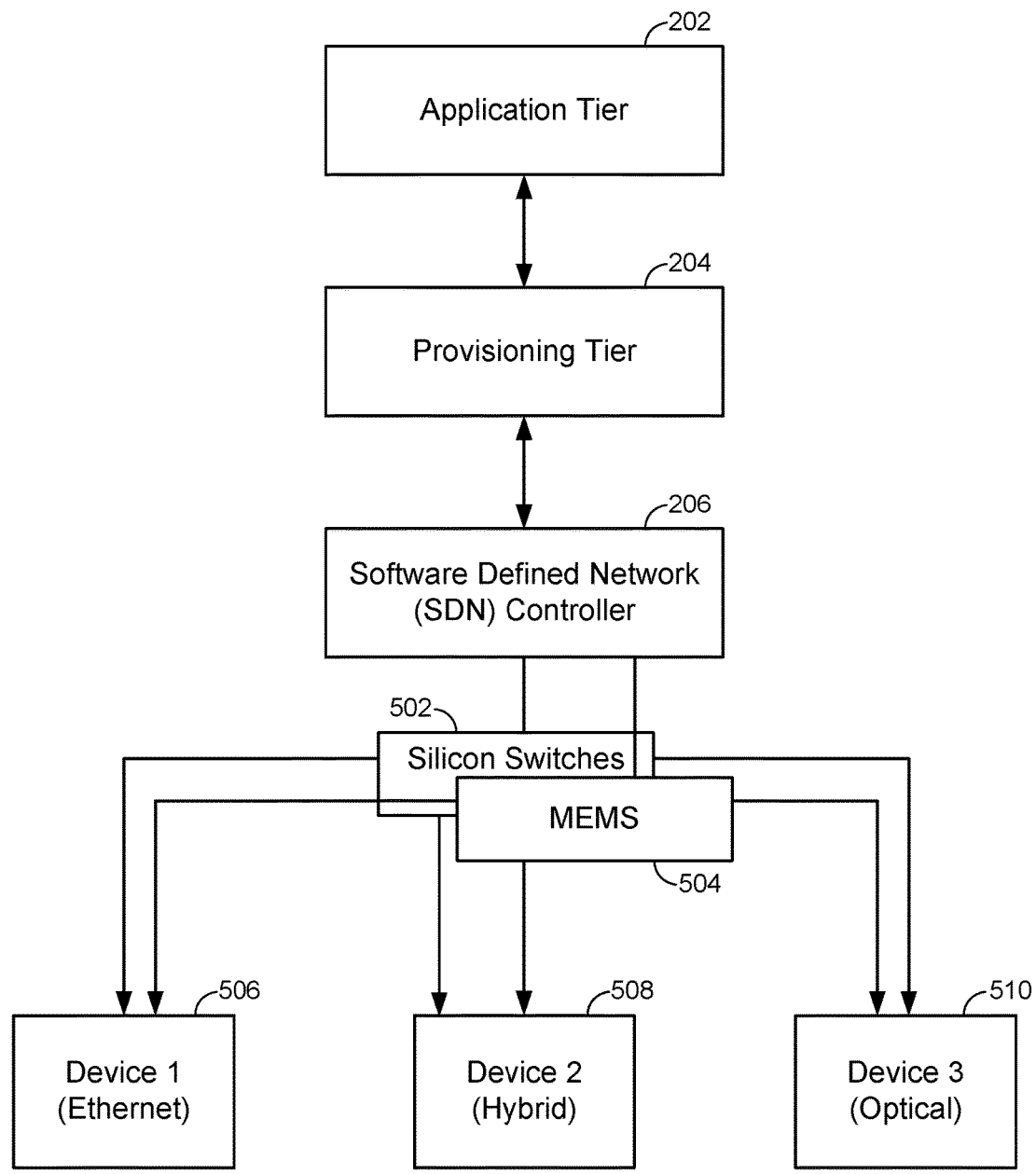
FIG. 5 illustrates an example communication system implemented using a layered protocol and having MEMS and electrical communication paths, in accordance with embodiments of the present disclosure.

FIG. 5 illustrates a communication system 500, in accordance with certain embodiments of the present disclosure. As illustrated, the SDN controller 206 may be configured to control two separate communication paths implemented using different types of switches. For example, a first communication path may be implemented using silicon switches 502 and the second communication path may be implemented using MEMS 504.

In certain embodiments, the provisioning tier 204 may obtain or determine a type of a data flow to be communicated between devices 506, 508, and 510. For example, based on the control flow details and forecasted size of the data flow, the management and orchestration layer (i.e., provisioning tier 204) may determine that a data flow is an elephant flow that may consume high bandwidth and is to be communicated with low latency. Based on the determination, the provisioning tier 204 may select the MEMS communication path and send an indication of the determined communication path to the SDN controller 206. Based on the indication, the SDN controller 206 may configure the silicon switches 502 or the MEMS 504 to communicate the data flow.

Figure 6:
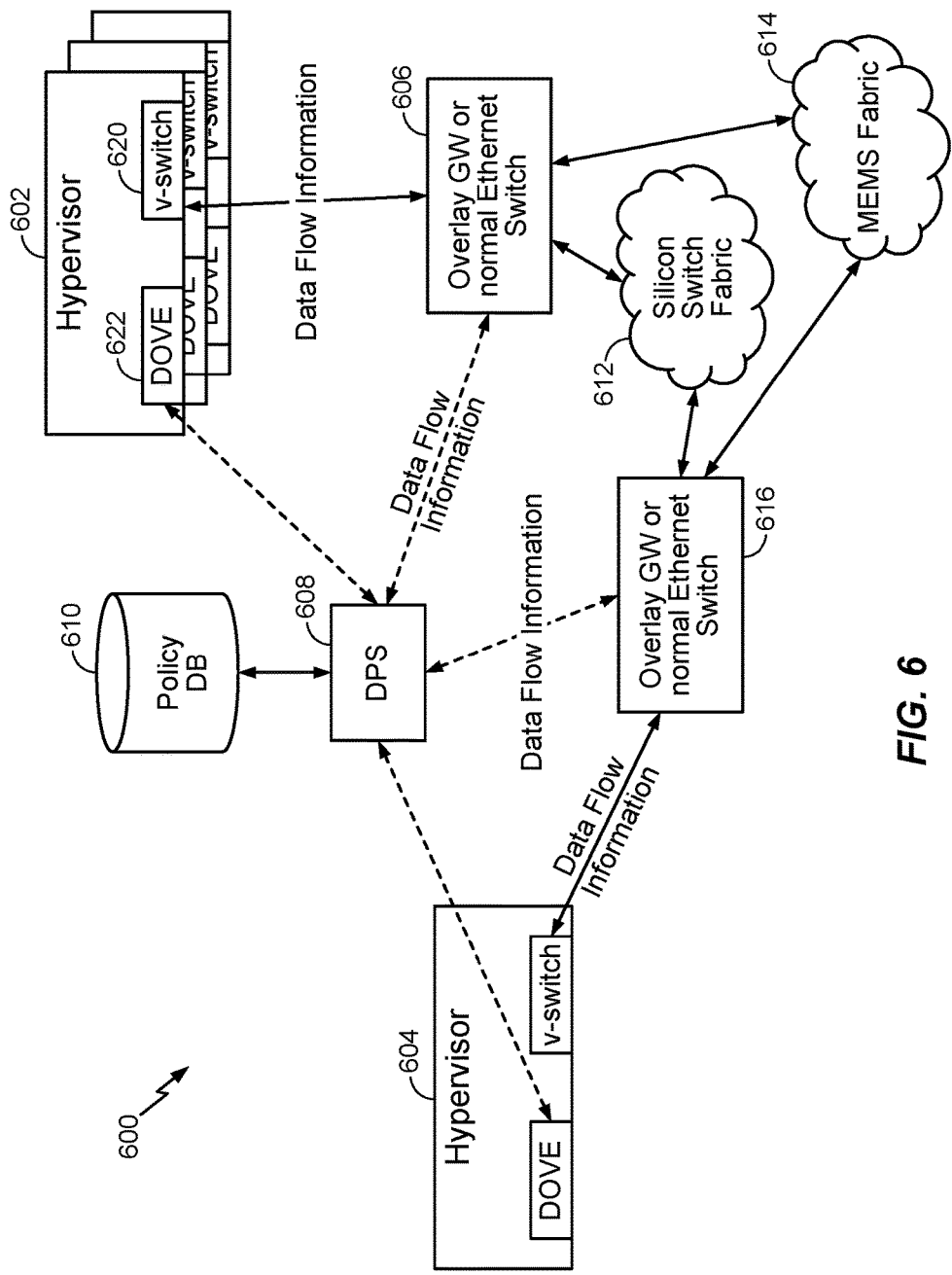
FIG. 6 illustrates an example communication system for communicating data flows between hypervisors, in accordance with certain embodiments of the present disclosure.

FIG. 6 illustrates a communication system 600, in accordance with certain embodiments of the present disclosure. The communication system 600 may include a hypervisor 602 that may generate a data flow for communication to another hypervisor 604.

A hypervisor is software running on a particular hardware platform that enables multiple operating systems (OSs) (e.g., virtual machines) to run on the platform at the same time. This feature may be accomplished by "virtualizing," or hiding technical details, of a computer resource from users of that resource. Virtualization may create the appearance to end users or other resources that a single computer resource functions as multiple virtual resources or that multiple physical resources appear as a single virtual resource.

As illustrated, the hypervisors 602 and 604 may include a virtual switch (v-switch) 620. A v-switch is a logical switching fabric that allows for the networking of virtual machines (VMs) managed by the hypervisor. The hypervisors 602 and 604 may also include a distributed overlay virtual Ethernet (DOVE) 622 which is a tunneling and virtualization technology for computer networks. DOVE allows for the creation of network virtualization layers for deploying, controlling, and managing multiple independent and isolated network applications over a shared physical network infrastructure.

In certain embodiments, the hypervisor 602 may send one or more data flows to a switch controller 606 for communication to the hypervisor 604. In certain embodiments, the switch controller 606 may be implemented as an overlay GW or an Ethernet switch. In some cases, the hypervisor 602 may determine, and indicate to the switch controller 606, a communication path to be used for communicating the data flow to the hypervisor 604. The communication path may be selected based on control flow information corresponding to the data flow. For example, by analyzing the control flow, details with respect to the data flow can be deduced. The data flow information may include a size of the data flow, whether the data flow is to be communicated with low latency, and/or whether the data flow is a dynamic data flow that may not be able to handle long establishment time of a communication path, bandwidth requirements of the data flow, or congestion impact on data flow. For example, assisted virtual motion (vmotion) of a virtual machine may be triggered by generation of a vmotion request ahead of time. Thus, by understanding the details of the vmotion request, details of the actual VM snapshots moving from one server to another server can be deduced.

In some cases, the hypervisor 602 may send the data flow information to the switch controller 606. In this case, the switch controller 606 determines the communication path based on the data flow information received from the hypervisor 602.

In certain aspects, the communication system 600 may also include a data policy switch (DPS) module 608. The DPS module 608 may be configured to receive information with regards to the data and determine a communication path for the data flow. For example, the DPS module 608 may communicate this information to the hypervisor or switch controller 606 such that the data flow can be communicated using a selected communication path. In some cases, the DPS module 608 may be coupled with a policy database (DB) 610. The policy DB 610 may store one or more policies with respect to how data flows are to be communicated. For example, the policy DB 610 may indicate that data flows corresponding to a specific application are to be communicated with low latency. In certain aspects, the policies maintained by the policy DB 610 may be user configurable. The DPS module 608 may obtain a policy corresponding to a data flow that is to be communicated from the hypervisor 602 to the hypervisor 604. Based on the policy, the DPS module 608 may determine the communication path, and provide an indication of the determined communication path to the hypervisor 602 or switch controller 606.

Based on the determined communication path, the switch controller 606 may select the silicon switch communication path (fabric) 612 or the MEMS communication path (fabric) 614 for communicating the data flow. The data flow may be received by another switch controller 616 and communicated to the hypervisor 604. In certain aspects, the other switch controller 616 may be implemented using an overlay GW or Ethernet switch. While the examples provided herein have described the communication of a data flow from hypervisor 602 to hypervisor 604 to facilitate understanding, the techniques provided herein can be applied to communication of a data flow from the hypervisor 604 to the hypervisor 602.

Certain embodiments of the present disclosure improve network congestion, latency and head-of-line blocking by providing multiple paths for data flow communication. In some cases, one or more of the communication paths may be used as a redundancy path to communicate data flows when other communication paths are not available. Certain embodiments of the present disclosure enable high performance, low cost, and effective bandwidth provisioning and load balancing across multiple paths.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

Embodiments of the present disclosure may be a system, a method, and/or a computer program product. The computer program product may include a computer readable storage medium (or media) having computer readable program instructions thereon for causing a processor to carry out embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method for communication of data flows, comprising:
    receiving control flow information corresponding to a data flow for communication from a first device to a second device;
    determining one or more characteristics of the data flow based on the control flow information;
    selecting one of a first communication path and a second communication path from a plurality of communication paths for communicating the data flow based on the determined characteristics of the data flow, wherein the first communication path comprises one or more silicon switches and the second communication path comprises one or more micro-electro-mechanical switches (MEMS), and wherein the selection of the communication path is based on a configurable policy corresponding to the data flow; and
    communicating the data flow via the selected communication path.

2. The method of claim 1, wherein:
    the communication of the data flow comprises controlling the silicon switches or the MEMS based on the selection.

3. The method of claim 1, wherein the selection of the communication path is based on an amount of available bandwidth on the communication path.

4. The method of claim 1, further comprising configuring the silicon switches or the MEMS by sending an indication of the communication path to a switch controller.

5. The method of claim 1, wherein the control flow information corresponding to the data flow comprises at least one of a size of the data flow or latency requirement of the data flow.

6. The method of claim 1, wherein the control flow information comprises an indication of whether the data flow is an elephant flow or a mice flow.

7. A data communication system, comprising:
    a plurality of communication paths having different attributes with respect to communication of a data flow;
    a first device coupled to the plurality of communication paths and configured to select one of a first communication path and a second communication path from the plurality of communication paths for communicating the data flow based on a characteristics of the data flow, wherein the first communication path comprises one or more silicon switches and the second communication path comprises one or more micro-electro-mechanical switches (MEMS), wherein the selection of the communication path is based on a configurable policy corresponding to the data flow, and wherein the first device is configured to communicate the data flow via the selected communication path; and
    a second device coupled to the plurality of communication paths and configured to receive the data flow via the selected communication path of the plurality of communication paths.

8. The data communication system of claim 7, further comprising:
    a switch controller configured to control communication of the data flow from the first device to the second device based on an indication of the selected communication path.

9. The data communication system of claim 7, further comprising a data policy module configured to:
    select the communication path based on the configuration policy; and
    send an indication of the selected communication path to the first device, wherein the selection of the communication path by the first device is based on the indication.

10. The data communication system of claim 7, further comprising:
    a policy database configured to store the configurable policy for communication of the data flow.

11. The data communication system of claim 7, wherein the first device comprises a hypervisor, the hypervisor including at least one of a virtual-switch (v-switch) module or distributed overlay virtual Ethernet (DOVE) module, wherein the communication path is selected by the at least one of the v-switch module or the DOVE module.

12. The data communication system of claim 7, wherein:
    the communication of the data flow by the first device comprises controlling the silicon switches or the MEMS based on the selected communication path.

13. The data communication system of claim 12, wherein:
    the first device is further configured to detect a change in characteristics of the data flow and select another communication path of the plurality of communication paths for communicating the data flow based on the detection; and
    the second device is further configured to receive the data flow via the other communication path.

14. An apparatus, comprising:
a processing system configured to:
- receive control flow information corresponding to a data flow to be communicated from a first device to a second device;
- determine one or more characteristics of the data flow based on the control flow information;
- select one of a first communication path and a second communication path from a plurality of communication paths for communicating the data flow based on the determined characteristics of the data flow wherein the first communication path comprises one or more silicon switches and the second communication path comprises one or more micro-electromechanical switches (MEMS), and wherein the selection of the communication path is based on a configurable policy corresponding to the data flow; and
- communicate the data flow based on the determined characteristics; and a memory coupled to the processing system.

15. The apparatus of claim 14, wherein:
the communication of the data flow comprises controlling the silicon switches or the MEMS based on the selection.

* * * * *